Patented July 17, 1951

2,561,222

UNITED STATES PATENT OFFICE 2,561,222

ELECTROLYTIC METHOD OF STRIPPING NICKEL, CHROMIUM, COPPER, ZINC, CADMIUM, SILVER, TIN, AND LEAD ELECTRODEPOSITS FROM FERROUS BASIS METALS, AND COMPOSITIONS FOR USE THEREIN

Frank Passal, Detroit, Mich., assignor to United Chromium, Incorporated, New York, N. Y., a corporation of Delaware No Drawing. Application October 22, 1948, Serial No. 56,052

3 Claims. (Cl. 204—146)

This invention relates to methods of stripping nickel, chromium, silver, tin, lead, copper, zinc and cadmium electrodeposits from ferrous basis metals, and to baths and compositions for use therein, and provides improvements therein.

Anodic processes for stripping electrodeposits from ferrous metals heretofore used require close pH control to avoid excessive attack on the ferrous metal.

The present invention provides a method carried out in a bath having a very low pH, which is replenished mainly with chromic acid, and which consequently keeps a low pH so that in practical operation no particular attention may be required in regard to the pH of the bath. In carrying out the method there is no significant attack on the ferrous basis metal. A polished ferrous basis metal does not require repolishing after coating metals have been stripped therefrom by the present method. It has the further advantage of removing, in one operation, the widely used copper, nickel, and chromium composite electrodeposits on steel.

According to the present invention an aqueous bath is made up of sodium nitrate ($NaNO_3$) and chromic acid ($CrO_3$), using about twice as much by weight of sodium nitrate as of chromic acid. A favorable concentration of these ingredients in solution is 200 g./l. sodium nitrate to 100 g./l. chromic acid. The concentration of the ingredients may be greater or less in the solution. The solution will give practical results at 100% greater concentration or at 50% less concentration. As made up, the solution has a pH of about 0.5.

Equivalents of the sodium nitrate are the alkali metal and alkaline earth metal nitrates.

A composition for making up the aforesaid bath consists essentially of two parts sodium nitrate ($NaNO_3$) to one part chromic acid ($CrO_3$) by weight.

Into an aqueous electrolytic bath having the above described composition, a ferrous metal article having thereon an electrodeposit of one or more of the metals nickel, chromium, silver, tin, lead, copper, zinc and cadmium is immersed and connected electrically as an anode in said solution. Also immersed in the solution is a cathode, which may be of duriron, nickel, etc. An electric current from a direct current generator is passed through said solution from the anode ferrous article having one or more of the aforesaid electrodeposits thereon to be stripped to the cathode. Under the action of the current, nickel, chromium, silver, tin, lead, copper, zinc and cadmium electrodeposits dissolve in the solution as dichromates.

Although agitation of the cathode, or of the electrolyte, is not necessary, it is preferable. It helps to dislodge or disperse viscous dichromate films of the electrodeposited metal which tend to build up on the anode surface and helps to remove or dislodge other anode reaction products, and in general will result in increased stripping rates and more uniform stripping action.

There is no consumption of the sodium nitrate by the stripping action. Consequently the concentration of the ingredients is maintained by adding from time to time mainly chromic acid. A small amount of sodium nitrate may be added also to replenish sodium nitrate lost in drag out. The chromic acid being used mainly for replenishment, the pH of the solution remains constantly at about 0.5, and the pH does not have to be watched.

The action of the bath, or bath and current, on the ferrous basis metal is so small as to be insignificant. The polished surface of the ferrous basis metal exposed by the removal of the electrodeposits thereon in the stripping action, is not affected enough to be noticed by eye, and the polished surface of the ferrous basis metal, after having been stripped of the electrodeposits thereon, does not require subsequent polishing in order to redeposit bright or smooth electrodeposits on the said ferrous metal surfaces.

It has also been found that the action of the bath and current produces an appreciable smoothing action on the ferrous basis metal by removing small burrs, projections, inclusions, etc., making the surface more receptive to satisfactory subsequent plating.

The bath is used at room temperature, which is an advantage inasmuch as the expense of heating and cooling media and equipment is avoided. It has been shown, however, that baths may be used at a temperature as low as 60° F. and as high as 140° F. Preferred anode current densities are ½ to 2 amperes per square inch. It has been found that stripping will take place with an anode current density as low as ¼ ampere per square inch and as high as 4 amperes per square inch.

The process acts to strip ordinary dull nickel as well as bright nickel, the action on the bright nickel being faster than on the dull nickel.

What is claimed is:

1. A method of stripping nickel, chromium, silver, tin, lead, copper, zinc and cadmium electrodeposits from ferrous basis metal consisting essentially in immersing, as an anode, a ferrous basis metal having an electrodeposit of one or more of the aforesaid electrodeposits thereon, in an aqueous bath consisting of 200 g./l. (plus 100% or minus 50%) $NaNO_3$ and 100 g./l. (plus 100% or minus 50%) $CrO_3$, and passing a direct electric current from said anode to a cathode.

2. An aqueous electrolytic bath for the stripping of nickel, chromium, silver, tin, lead, copper, zinc and cadmium electrodeposits from ferrous basis metal, made up of 200 g./l. $NaNO_3$ and 100 g./l. $CrO_3$, plus 100% or minus 50% of said ingredients.

3. A composition of matter for making up electrolytic baths for the stripping of nickel, chromium, silver, tin, lead, copper, zinc and cadmium electrodeposits from ferrous basis metal consisting essentially of 2 parts $NaNO_3$ to one part $CrO_3$, by weight.

FRANK PASSAL.

REFERENCES CITED

The following references are of record in the file of this patent:

"Metal Cleaning & Finishing," Nov. 1933, pages 464 through 466.

"Plating," Apr. 1948, page 404.